United States Patent [19]

Seesengood

[11] 4,361,930
[45] Dec. 7, 1982

[54] CASTER SOCKET ASSEMBLY

[75] Inventor: Robert E. Seesengood, Conway, Ark.

[73] Assignee: Tiffany Industries, Inc., St. Louis, Mo.

[21] Appl. No.: 94,709

[22] Filed: Nov. 16, 1979

[51] Int. Cl.³ .............................................. B60B 33/00
[52] U.S. Cl. ......................................... 16/38; 403/361
[58] Field of Search ...................... 16/37, 38; 403/361, 403/230

[56] References Cited

U.S. PATENT DOCUMENTS 10,488  1/1854  White ...................................... 16/38

FOREIGN PATENT DOCUMENTS 157345   6/1954  Australia .................................. 16/38
1133609 11/1968  United Kingdom ..................... 16/38

Primary Examiner—Wayne L. Shedd
Attorney, Agent, or Firm—Cohn, Powell & Hind

[57] ABSTRACT

A caster socket assembly for attachment of a caster to a furniture leg having an opening. The assembly includes a plastic housing having a cylindrical socket provided with an annular groove, the housing being insertable in the opening of the furniture leg. A caster includes a cylindrical pintle having an annular groove which is insertable in the socket. A split C-ring is attached to the caster at the pintle groove and is selectively engageable with the housing at the socket groove to retain the pintle in the housing. The C-ring has an expanded outside diameter greater than the pintle, and is resiliently compressible for sliding the pintle into and out of the housing socket and is resiliently expandable within the housing socket groove to retain the pintle within the housing socket in a mounted position. The C-ring remains expanded in the housing socket groove under the normal weight of the caster, and is resiliently compressible within the pintle groove and out of the housing socket groove for removal of the pintle from the housing socket when a sufficient axial force is applied to the pintle. The C-ring is rotatably attached to the pintle to facilitate rotation of the pintle within the housing.

2 Claims, 3 Drawing Figures

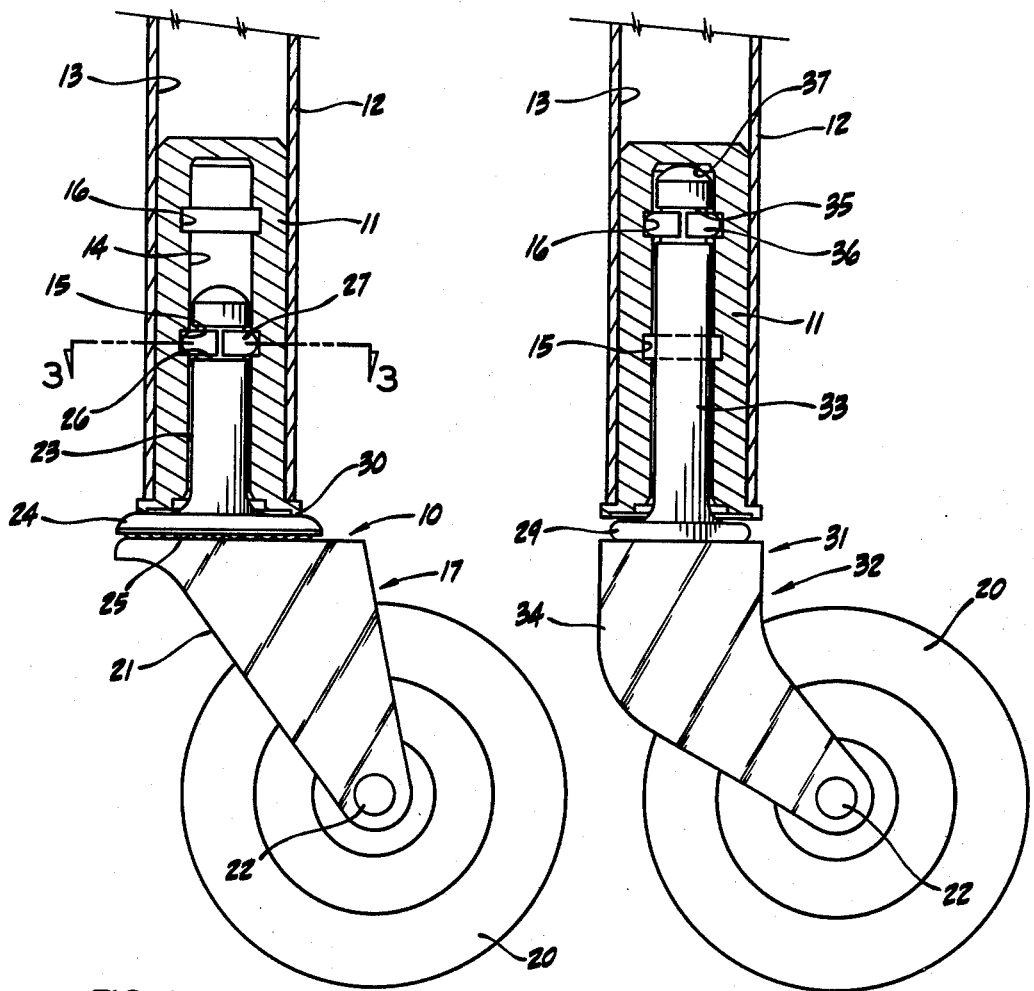
FIG. 1.
FIG. 2.
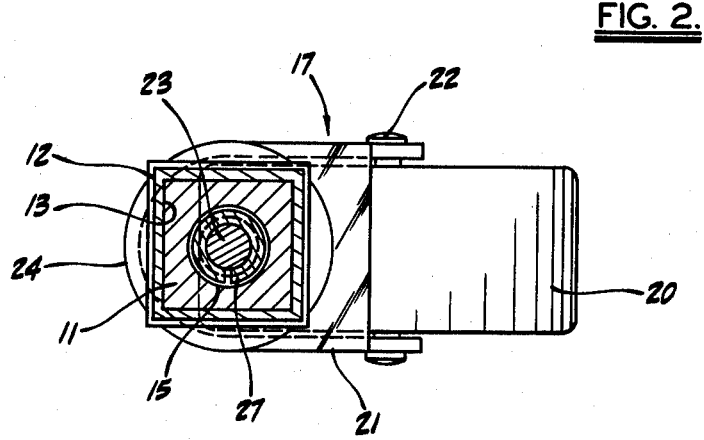
FIG. 3.

CASTER SOCKET ASSEMBLY

BACKGROUND OF THE INVENTION

This invention relates generally to improvements in casters, and particularly to an improved caster socket assembly employing a plastic housing to receive a caster pintle.

Caster socket assemblies employing plastic housing to receive and hold pintles are known. In the known devices, the plastic housings include protusions which engage a groove in the pintle. These devices rely on the resiliency of the plastic housing to maintain the pintle within the housing.

SUMMARY OF THE INVENTION

This caster socket assembly provides a means by which a pintle is retained within a plastic housing without relying on the resiliency of the plastic housing. The caster socket assembly is utilized for attachment of a caster to a furniture leg having an opening.

The assembly includes a plastic housing having a cylindrical socket provided with an annular groove. The housing is insertable in the opening of a furniture leg. The assembly includes a caster which has a cylindrical pintle having an annular groove. The pintle is insertable in the housing socket. A retaining means is attached to the caster at the pintle groove, and is selectively engageable with the housing at the socket groove to retain the pintle in the housing.

In one aspect of the invention, the retaining means includes a split C-ring attached to the caster at the pintle groove. The C-ring has an outside diameter greater than the pintle and is resiliently compressible for sliding the pintle into and out of the housing socket, and is resiliently expandable within the housing socket groove to retain the pintle within the housing socket in a mounted position.

The C-ring remains expanded in the housing socket groove under the normal weight of the caster, and is resiliently compressible within the pintle groove and out of the housing socket for removal of the pintle from the housing socket when a sufficient axially force is applied to the pintle.

In one aspect of the invention, the housing includes a lower bearing surface engageable with the caster for carrying weight applied to the furniture leg when the caster is in the mounted position. In another aspect, the housing includes a closed top end of the socket. The closed end provides a rotative bearing surface for engaging the top of the pintle and for transferring weight applied to the furniture leg to the caster when the caster is in the mounted position.

In one aspect, the C-ring is rotatably attached to the pintle to facilitate rotation of the pintle within the housing. In another aspect of the invention, the cylindrical housing socket is provided with a vertically spaced second annular groove. A caster having a split C-ring attached to a cylindrical pintle at an annular groove is selectively received in the second housing socket groove. The housing socket thereby accomodates pintles of different length.

BRIEF DESCRIPTION OF THE DRAWINGS

FIG. 1 is a partial sectional view of a caster socket assembly;

FIG. 2 is a partial sectional view of another caster socket assembly, and

FIG. 3 is a sectional view taken on line 3—3 of FIG. 1.

DESCRIPTION OF THE PREFERRED EMBODIMENTS

Referring now by characters of reference to the drawings and first to FIG. 1, the caster socket assembly generally indicated by 10 includes a plastic housing 11 which is insertable into a furniture leg 12. The housing 11 can be a pressed-fit within an opening 13 in the furniture leg 12. The housing 11 has a cylindrical socket 14 provided with first annular groove 15 and a second annular groove 16. A caster generally indicated by 17 includes a wheel 20 rotatively connected to a fork 21 by a pivot pin 22. A cylindrical pintle 23 is rotatively connected to the caster fork 21. A ball race portion 24 containing a plurality of ball bearings 25 is connected to the pintle 23 in a conventional manner, facilitating rotation of the fork 21 relative to the pintle 23.

The pintle 23 has an annular groove 26. A C-ring 27 constituting retaining means, is attached to the caster 17 at the pintle groove 26 and is selectively engageable with the housing 11 at the socket groove 15 to retain the pintle 23 in the housing 11. The C-ring 27 has an expanded outside diameter which is greater than that of the pintle 23. The C-ring 27 is resiliently compressible for sliding the pintle 23 into and out of the housing socket 14. The C-ring 27 is resiliently expandable within the housing socket groove 15 in a mounted position. The C-ring 27 remains expanded in the housing socket groove 15 under the normal weight of the caster and is resiliently compressible within the pintle groove 26 and out of the housing socket groove 15 for removal of the pintle 23 from the housing socket 14 when a sufficient axial force is applied to the pintle 23. The C-ring 27 is rotatably attached to the pintle 23 to facilitate rotation of the pintle 23 within the housing 11.

The housing 11 includes a lower bearing surface 30 which engages the caster 10 at the ball race 24 to transfer weight applied to the leg 12 to the swivel caster 17 when the caster 17 is in the mounted position as shown in FIG. 1.

Referring now to the top bearing caster socket assembly 31 of FIG. 2, in which similar parts are given the same reference numbers as the parts of the caster socket assembly 10, a caster 32 includes a cylindrical pintle 33 having a belled bottom portion 29 which is fixedly attached to a caster fork 34 in a conventional manner. The pintle 33 includes an annular groove 35. A C-ring 36 is attached to the pintle 33 at the groove 35 and is selectively engageable with the housing 11 at the socket groove 16 in the same manner as described in regard to the caster socket assembly 10. The plastic housing 11 includes a closed end 37 which provides a rotative bearing surface for engageing the top of the pintle 33 and transferring weight applied to the furniture leg 12 to the caster 32 when the caster 32 is in the mounted position shown in FIG. 2.

It will be understood that the C-rings 27 and 36 are rotatively attached to the pintles 23 and 33 respectively, thereby facilitating rotation of the pintles 23 and 33 within the housing 11. This rotation is especially significant in the caster socket assembly 31 of FIG. 2, as rotation of the caster 32 depends upon rotation of the pintle 33 within the housing 11.

The housing 11 includes both the first groove 15 and second groove 16 to permit the use of either the caster 17 or the caster 32 with the housing 11. The top bearing caster 32 has a pintle 33 which is longer axially than the pintle 23 of the swivel caster 17.

It is thought that the structural features and functional advantages of this apparatus have become fully apparent from the foregoing description of parts, but for completeness of disclosure the operation of the apparatus will be briefly discussed.

The plastic housing 11 is first mounted within a furniture leg 12 such as by a press-fit. The caster 17 can then be removably mounted in the housing 11. The pintle 23 is inserted into the housing socket 14 with a sufficient axial force to compress the split C-ring 27 so that it slidably engages the housing 11, and upon reaching the housing groove 15 expands to its uncompressed diameter. The split C-ring 27 will retain the caster 17 within the housing 11 under the normal weight of the caster 17 such as when the furniture leg 12 is lifted. When it is desired to remove the caster 17 from the housing 11, the reverse sequence of operation is applied. A sufficient axial force is applied to the caster 11 to compress the split C-ring 27 and allow it to slide out of the housing 11.

The mounting of the top bearing caster 32 is similar to that of the caster 17. However, it should be noted that when mounting and removing the caster 32, the split C-ring 36 willexpand within the housing slot 15, at which time it will be necessary to apply a sufficient axial force to the caster 32 to recompress the split C-ring 36, thereby allowing it to slide further within the housing 11 to the desired mounted or removed position.

I claim as my invention:

1. A caster socket assembly for attachment of a caster to a furniture leg having an opening, comprising:
   (a) a plastic housing having a cylindrical socket provided with an annular groove, the housing being insertable in the opening of the furniture leg,
   (b) a caster including a cylindrical pintle having an annular groove, the pintle being insertable in the socket,
   (c) a retaining means attached to the caster at the pintle groove, and selectively engaging the housing at the socket groove to retain the pintle in the housing,
   (d) the retaining means including a split C-ring attached to the caster at the pintle groove, the C-ring having an outside diameter greater than the pintle, the C-ring being resiliently compressible for sliding the pintle into and out of the housing socket, and being resiliently expandable within the housing socket groove to retain the pintle within the housing socket in a mounted position,
   (e) the C-ring remaining expanded into the housing socket groove under the normal weight of the caster, and is resiliently compressible within the pintle groove and out of the housing socket for removal of the pintle from the housing socket when a sufficient axial force is applied to the pintle,
   (f) the cylindrical housing socket having a vertically spaced, second annular groove,
   (g) a caster is provided including a cylindrical pintle of different length than the first said pintle and having an annular groove,
   (h) a split C-ring is attached to the caster at the last said pintle groove and is selectively received in the said second housing socket groove for accomodating pintles of different lengths,
   (i) the housing includes a closed top end of the socket, the closed end providing a rotative bearing surface for engaging the top of the pintle of one of said casters and transferring weight applied to the furniture leg to said caster when the caster is in the mounted position, and
   (j) the housing includes a lower bearing surface engageable with the other of said casters for carrying weight applied to the furniture leg when said other caster is in the mounted position.

2. A caster socket for use with either top bearing or bottom bearing casters for attachment of a caster to a furniture leg having an opening comprising:
   (a) a plastic housing having a cylindrical socket provided with first and second spaced annular grooves, the housing being insertable in the opening of the furniture leg, the housing including:
      1. a lower bearing surface engageable with a bottom bearing caster, and
      2. a closed top end of the socket, providing a rotative bearing surface for engagement with a top bearing caster.

* * * * *